United States Patent Office 2,826,534
Patented Mar. 11, 1958

2,826,534

PROCESS FOR THE PURIFICATION OF INSULIN

Russell L. Kutz, Chicago, Ill., assignor to Armour and Company, Chicago, Ill., a corporation of Illinois No Drawing. Application April 4, 1957
Serial No. 650,798

7 Claims. (Cl. 167—75)

This invention relates to the purification of insulin. More particularly, this invention relates to a method for selectively precipitating insulin from an aqueous solution containing insulin and non-insulin proteins. The selective precipitation method of this invention has its greatest utility when incorporated in present purification processes for insulin immediately after or in place of the usual isoelectric precipitation.

In the United States most commercial processes for extracting and purifying insulin follow a rather well defined pattern as to the broad steps employed. The insulin is extracted from pancreas glands with acidified aqueous ethanol, the insulin extract is concentrated and the alcohol removed by distillation under reduced pressure. The insulin is then salted out with sodium chloride. The insulin salt cake is usually reworked at a lower concentration of sodium chloride. For example, the insulin may be first salted out at a 30% salt concentration and then at a 15% salt concentration. The insulin is then further purified by an isoelectric precipitation from an aqueous solution at a pH of about 5.2 (the normal isoelectric point of insulin). Usually, this isoelectric precipitate is not sufficiently pure to be sold as U. S. P. amorphous insulin or to be directly crystallized to produce U. S. P. crystalline insulin. Therefore, further purification steps are required.

One purifying step which has been used involves the precipitation of non-insulin proteins from aqueous acetone by gradually raising the pH to around pH 6. This procedure does not work well in practice because the precise pH required to effect the fractionation varies from batch to batch, while the pH range over which the non-insulin proteins can be precipitated without also precipitating insulin is very narrow. This causes considerable indefiniteness in the process at this point and greatly increases the difficulty of controlling the process to assure both high yields and good purity.

Therefore, it is an object of this invention to provide a new method for purifying insulin after isoelectric precipitation which overcomes the difficulties of the prior method mentioned above. It is a further object of this invention to provide a process by means of which an isoelectric precipitate of insulin can be purified in a single step sufficiently to be sold as U. S. P. amorphous insulin, or to be used without further purification in preparing U. S. P. crystalline insulin. A still further object is to provide a method which permits the elimination of the usual isoelectric precipitation and other purifying steps so that insulin salt cake can be treated in one step, if desired, to produce U. S. P. amorphous insulin or to provide an amorphous insulin which can be crystallized to produce U. S. P. crystalline insulin. Further objects and advantages will appear as the specification proceeds.

One method of practicing this invention employs insulin salt cake as a starting material. The insulin salt cake preferably contains insulin having a purity comparable to the purity of insulin in ordinary 15% insulin salt cake. However, it is not necessary that the salt cake be obtained by precipitating insulin at exactly a 15% concentration of sodium chloride, since a salt cake obtained within the concentration range of from 10 to 20% is satisfactory. Also, insulin salt cakes prepared with other salts than sodium chloride can be used.

The insulin salt cake is dissolved in acidified water and subjected to the usual isoelectric precipitation at pH 5.2. The 5.2 precipitate will be an amorphous insulin substantially free of salt but containing substantial quantities of non-insulin proteins. This partially purified amorphous insulin is further purified according to the method of this invention by dissolving it in water at a pH not over 4 (preferably below 3.7). The pH used for dissolving the insulin can be as low as 2.0 without serious disadvantage, although the optimum pH appears to be around 3.5. Various inorganic and organic acids can be employed to acidify the water, but acetic acid is preferred for reasons which will subsequently become apparent. The concentration of insulin in the acidified aqueous solution is not particularly critical, and can range from as little as 25 to as much as 150 units of insulin per milliliter.

This aqueous solution at a pH below 4, substantially free of salt but containing substantial quantities of non-insulin proteins, is then subjected to a fractionation procedure, which preferably consists of two steps. The pH of the aqueous solution is gradually raised by the addition of an inorganic base, such as an alkali metal hydroxide, until a pH of at least 6.8 is reached. Preferably, the pH is raised to above 7.0. As the pH of the solution passes over the normal isoelectric point of insulin, a precipitate will form, but this precipitate will be redissolved at the higher pH's. In fact, the redissolving of this precipitate is one of the main purposes of going to a near neutral or alkaline pH. Complete and rapid redissolving of the precipitate can be obtained by adjusting the pH of the solution upwardly to from pH 7.5 and above, although the redissolving is substantial at about pH 6.8 and proceeds rather rapidly at pH's above 7.0. It is preferred to accompany the upward pH adjustment with agitation to promote the redissolving of the precipitate. It will be understood that the upper limit for the aforementioned alkaline pH adjustment is the pH at which the insulin activity would be destroyed under the conditions of the process i. e. about pH 10.

As the next step in the fractionating procedure, the pH is reduced by adding an inorganic or organic acid until the pH of the solution is within the range from pH 5.9 to 5.3. Preferably, the pH is adjusted to a pH ranging from 5.8 to 5.4. This causes the insulin to precipitate in greatly purified form, so that it can be readily separated from the supernatant by decanting, centrifugation, or filtration.

The fractionating procedure just described can be used to selectively precipitate insulin from any aqueous solution of insulin and non-insulin proteins having a pH below the normal isoelectric pH of insulin. It should be emphasized that the fractionating procedure set out is not the equivalent of an ordinary isoelectric precipitation. This is shown by the fact that a second isoelectric precipitation of an isoelectric insulin precipitate does not result in a significant purification. On the other hand, the use of an isoelectric precipitate as the starting material for applicant's process results in a great increase in the purity of the insulin.

Best results have been achieved when the aqueous solution of insulin is acidified with acetic acid. When acetic acid is used for this purpose, it is preferred to use ammonium hydroxide to make the upward pH adjustment. This will form ammonium acetate in situ. It is believed that the buffer action of ammonium acetate is desirable to facilitate the pH adjustments, and that the presence of ammonium ions favors the precipitation of the insulin. However, if desired, ammonium acetate can be added and need not be formed in the solution, or other buffers can be used. Acetic acid is also preferred for making the downward pH adjustment.

As indicated above, the insulin precipitate obtained by the fractionating procedure of this invention is much more pure than an isoelectric insulin precipitate. Purities up to .0060 mg. N/unit have been obtained. This permits the product to be sold as amorphous insulin, since the U. S. P. specifies a maximum of .0085 mg. N/unit. Also, the amorphous insulin can be used to prepare crystalline insulin of exceptional purity. This will be apparent when it is realized that the U. S. P. specification for crystalline insulin permits a maximum of .007 mg. N/unit. Amorphous insulin produced in accordance with this invention is already of practically sufficient purity for crystalline insulin, and need only be crystallized according to the usual procedure with zinc or other heavy metal.

If desired, the usual isoelectric precipitation can be omitted as well as other purifying steps between the in-insulin salt cake and crystalline insulin by substituting the fractionating procedure described above. However, it is preferred to employ the fractionating procedure of this invention immediately after the usual isoelectric precipitation. When the isoelectric precipitation is omitted, a product of somewhat lower purity may be obtained, but this is balanced against the gain in time and cost by the elimination of an extra step.

This invention is further described in the following specific examples.

Example I

In its preferred form, the following fractionating procedure is employed immediately after the usual isoelectric precipitation of the insulin. The isoelectric precipitate is dissolved by using acetic acid in water at an insulin concentration of approximately 50 units per milliliter, the pH is adjusted to 3.5. Ammonium hydroxide is now added to a pH of approximately 7.5 to 8.0. Acetic acid is again added to pH 5.6. The precipitated insulin, which is much more pure than the isoelectric insulin, is separated from the supernatant.

Example II

A 5000 pound batch of frozen beef pancreas glands was hashed and extracted with an aqueous solution acidified to pH 3.0 with phosphoric acid and containing approximately 65% ethanol. The extracted tissue was removed by filtration and the pH of the extract was adjusted to 8.0 by the addition of ammonium hydroxide after which the solution was again filtered. The solution was acidified by the addition of sulfuric acid to a pH of 3.5 after which alcohol was removed by distillation to reduce the volume to about 1000 gallons. The residual material had a composition containing approximately a 20% ethanol concentration.

The 20% ethanol concentrate was filtered and returned to the still and further concentrated to a volume of approximately 560 gallons. Substantially all of the ethanol was removed from the concentrate by this procedure. To this concentrate was added 1400 pounds of sodium chloride thereby forming a 30% salt cake which was separated from the mixture. The salt cake was dissolved in water which had been acidified to pH 2.0 with hydrochloric acid and 125 pounds of sodium chloride was added to the solution. The resulting 16% salt cake was removed and redissolved in 27 gallons of acidified water (pH 2.0). An isoelectric precipitation was effected by raising the pH to 5.2 by the addition of 6 N NaOH.

The pH 5.2 isoelectric precipitate was separated and suspended in 38 gallons of distilled water and the pH was adjusted with acetic acid to pH 3.5. The pH was then raised to between 7.5 and 8.0 using ammonium hydroxide. The pH was then adjusted back to 5.6 by the addition of acetic acid. The precipitate formed at this step was separated and processed according to well known and conventional procedures to yield a crystalline insulin product.

Example III

The procedure in this experiment involved substantially the same steps described in Example II up to and including the preparation and isolation of the 16% salt cake. From that point on, however, the procedure was modified by omission of the isoelectric precipitation described therein.

The 16% salt cake was suspended in water acidified to pH 3.3 with acetic acid. The mixture was made alkaline by adding sufficient ammonium hydroxide to raise the pH to about 8.0 after which it was adjusted back to pH 5.6 by the addition of acetic acid. The precipitate was separated and processed according to well known methods to yield a crystalline insulin product.

This application is a continuation-in-part of my co-pending application Serial No. 345,698, filed March 30, 1953, now abandoned.

While in the foregoing specification this invention has been described in preferred embodiments and specific details thereof have been set forth, it will be apparent to those skilled in the art that many of the embodiments and details set forth can be varied considerably without departing from the broad idea of the invention.

I claim:

1. In a process for purifying insulin wherein an isoelectric precipitate of insulin is obtained, the method of further purifying the insulin characterized by the steps of preparing an aqueous solution of said isoelectric insulin precipitate having a pH of from 2 to 4, raising the pH of said aqueous solution to a pH above 6.8 but below the pH destructive of insulin, whereupon any precipitate formed during the pH adjustment is redissolved, and then lowering the pH of said aqueous solution still containing both the dissolved insulin precipitate and non-insulin protein impurities to a pH within the range of from 5.9 to 5.3 to selectively precipitate the insulin.

2. In a process for purifying insulin wherein an isoelectric precipitate of insulin is obtained, the method of further purifying the insulin characterized by the steps of dissolving said isolectric insulin precipitate in acidified water to produce an aqueous solution thereof having a pH of from 2.0 to 3.7, adjusting the pH of the solution upwardly to a pH of from 7.0 to 8.0 while agitating the solution to completely redissolve any precipitate formed during the pH adjustment, and then lowering the pH of said solution still containing both the dissolved insulin precipitate and non-insulin protein impurities to a pH within the range of from 5.9 to 5.3 to selectively precipitate the insulin.

3. The process of claim 2 in which the pH of said solution still containing both the dissolved insulin precipitate and non-insulin protein impurities is adjusted downwardly to a pH ranging from 5.8 to 5.4 to selectively precipitate the insulin.

4. In a process for purifying insulin wherein an isoelectric precipitate of insulin is obtained, the method of further purifying the insulin characterized by the steps of dissolving an isoelectric precipitate of insulin in water acidified with acetic acid to produce an aqueous solution thereof having a pH of from 2 to 4, raising the pH of said solution to a pH above 6.8 but below the pH at which insulin is destroyed by adding ammonium hydroxide thereto, and then lowering the pH of said solution still containing both the dissolved insulin precipitate and non-insulin protein impurities to a pH within the range of from 5.9 to 5.3 to selectively precipitate the insulin.

5. In a process for purifying insulin wherein an isoelectric precipitate of insulin is obtained, the method of further purifying the insulin characterized by the steps of dissolving an isoelectric precipitate of insulin in water acidified to a pH of from 2.0 to 3.7 with acetic acid, raising the pH of said solution to a pH of from 7.0 to 8.0 by adding ammonium hydroxide thereto, and then lowering the pH of said solution still containing both the dissolved insulin precipitate and non-insulin protein impurities to a pH within the range of from 5.8 to 5.4 to selectively precipitate the insulin.

6. A method of selectively precipitating insulin from and aqueous solution of insulin and non-insulin proteins having a pH of from 2 to 4, characterized by the steps of raising the pH of said solution to a pH of from 7.0 to 8.0 at which any precipitate formed during the pH adjustment is redissolved, and then lowering the pH of said solution still containing said insulin and non-insulin proteins to a pH within the range of from 5.8 to 5.4 to selectively precipitate the insulin.

7. The method of claim 6 in which said first mentioned solution is acidified to a pH of from 2 to 4 with acetic acid, and in which said upward pH adjustment is made by adding ammonium hydroxide to said solution.

References Cited in the file of this patent

UNITED STATES PATENTS 2,174,862   Sahyun _____ Oct. 3, 1939

OTHER REFERENCES

Manufacturing Chemist and Manufacturing Perfumer, XX:1, pp. 10–15, January 1949.